United States Patent Office 3,555,828

Patented Jan. 19, 1971

3,555,828

METHOD FOR PREVENTING WATER LOSS FROM RESERVOIRS AND CHANNELS

Herbert Goldstein, Elizabeth, Henry T. Ingram, Roselle, and Robert J. Kufrin, Rocky Hill, N.J., assignors to Witco Chemical Corporation, New York, N.Y., a corporation of Delaware No Drawing. Filed June 18, 1968, Ser. No. 737,849

Int. Cl. E02b *5/02*

U.S. Cl. 61—1 11 Claims

ABSTRACT OF THE DISCLOSURE

Inhibiting water loss due to seepage into earth or soil substrata surfaces of water catchment reservoirs or channels by applying a liquid elastomeric coating composition over said soil strata surfaces, and then curing said coating composition to form a continuous, thin cohesive membrane which inhibits water loss from the body of water due to seepage into the soil substrata surfaces.

This invention relates to a new and improved method for lining earth or soil substrate surfaces of water catchment reservoirs and channels to inhibit water losses.

The loss of water from reservoirs, storage ponds, irrigation ditches and the like is a serious problem. One of the major causes of such losses is seepage through the substrate soil surfaces. Lining the soil surfaces to minimize losses due to seepage has been practiced for many years employing such techniques and materials as, for example, lining soil surfaces with factory prepared rolls or sheets of waterproof membranes of rubber, polyethylene, polyvinyl chloride and other well known film materials or applied-in-place seamless water barriers of asphalt paving, Gunnite concrete coatings and bituminous cutbacks. The expenses involved in employing these known methods are excessive from a labor and/or material standpoint and reliability is often times questionable.

Thus, for example, said preformed membranes must be carefully hand placed, butted together and each joint must be hand sealed by various methods such as hot or cold applied sealing compounds to fill in joints, laminating adhesives to bond together overlapping joints, or heat sealing in the case of some plastic films. Over and above the fact that such operations are time-consuming and require much labor, considerable care must be taken in the preparation of the soil substrate so as to minimize any surface irregularities which would only be bridged by the membrane sheet leaving voids below the sheet which could break open when subjected to the pressures created by the weight of the contained water. In the case of asphalt paving barriers employed to minimize seepage through soil substrates, they are applied in accordance with essentially the same practices used in asphalt pavement highway construction. This is an expensive operation since substantial thicknesses of asphalt paving material are required, and heavy machinery is necessary to properly lay, grade and compact the asphalt paving material to obtain the desired degree of waterproofing. Gunnite concrete coatings likewise are expensive in that substantial thicknesses are necessary both for waterproofing and to provide sufficient strength to the coatings to enable them to resist cracking due to the normal stresses placed thereon resulting from soil movement, expansion and/or contraction of the coating, and the like. Bituminous cutbacks, while less expensive than asphalt paving and Gunnite concrete coatings, have proven to be unsatisfactory since the films provided by the cutbacks generally do not have sufficient flexibility and elasticity to "move" with the soil substrate and, therefore, are prone to develop leaks within a very short time thereby requiring frequent inspection and maintenance.

In accordance with the present invention we have discovered an improved method for lining the substrate soil surfaces of water catchment reservoirs, channels and the like which comprises applying a continuous film of liquid elastomeric polymers as hereinafter more fully described that will cure or set under ambient conditions to form a conforming water barrier over the water retaining substrate surfaces thereby substantially reducing water losses due to seepage.

The coatings applied in accordance with the practice of the present invention substantially conform to the surfaces treated as a continuous, relatively thin, membrane exhibiting a high degree of imperviousness to water as well as toughness, abrasion resistance and ability to withstand soil movement due to mechanical or temperature conditions.

The method according to the present invention involves applying a continuous, relatively thin coating of liquid polymer materials over the entire substrate surface. The polymer then cures or sets to form a conforming elastomeric membrane barrier having suitable cohesive strength. The cured membrane provides effective permanent inhibition to water seepage into the soil substrate.

Curing of the elastomeric polymer material to form the conforming membrane barrier may be accomplished in some instances by using catalysts, crosslinking agents or mixtures thereof. In other instances the curing occurs spontaneously upon contact with the atmosphere or the moisture contained in the atmosphere. In still other instances the elastomeric polymer materials may set without curing into barrier coatings suitable for use in accordance with the present invention.

Materials suitable for use in accordance with the present invention are liquid elastomeric polymers that are capable of being applied as relatively thin, continuous films, and will cure or set in place under ambient conditions into continuous water resistant elastomeric membranes that exhibit good physical properties, toughness and abrasion resistance with enough elasticity to resist substrate movement over a relatively wide range of temperatures. Generally, the physical characteristics, rather than the chemical structures, of the materials employed would be controlling in its choice. In light of the present specifications, a person skilled in the art can select suitable materials to provide the desired characteristics though materials as subsequently discussed herein are preferred.

Polyurethane elastomers are well known and these polymers have been found to have characteristics making them useful for numerous applications. Polyurethane elastomer may be prepared from liquid one or two-component systems that will cure or set after application and may be advantageously employed in accordance with the practice of the present invention.

Particularly suitable as the coating materials of the present invention are polyurethane bituminous elastomers prepared from liquid resin-bitumen admixtures. In general it is well known that resins used in preparing polyurethanes are not compatible with the various bituminous materials. Polyurethane prepolymers, i.e., the reaction product of a molar excess of a polyisocyanate with a compound containing a plurality of hydroxy or carboxy groups that are reactive with isocyanate groups, are shown, for example, in U.S. Pat. 3,179,610 as exhibiting somewhat greater compatibility with bituminous compositions, particularly bitumens such as tars. Polyurethane elastomers prepared by reaction of a polyisocyanate with polydiene polymers or copolymers containing terminal allylic hydroxy groups commercially available, for instance, under the tradename "Poly B-D" have been found to be compatible with bituminous compositions over a wide range of blends. Polyurethane-bitumen elastomer compositions prepared by reaction of a polyisocyanate and an admixture of polydiene polymers or copolymers having terminal allylic hydroxy groups and bitumens such as asphalt and tar, and especially the asphalts, wherein said elastomers comprise, by weight, between about 20% and 90% and preferably between about 30% and 70% of the polyurethane component and between about 80% and 10%, and preferably between about 70% and 30% of the bitumen component are especially suitable and preferred as the coating compositions of the present invention.

The polyisocyanates that may be employed in preparing polyurethane elastomeric coating compositions suitable for use in accordance with the practice of the present invention are well known in the art and may be any organic polyisocyanate having 2, 3 or more functional or reactive isocyanate groups and may be an aromatic, aliphatic or aliphatic-aromatic compound. The amount of polyisocyanate to be used will generally be determined so as to provide a range of from about 0.8 to 1.5 or even more equivalents of isocyanate groups per active hydrogen in the resin.

The terms "bituminous compositions," "bitumen," "asphalt" and "tar" are used herein in their commonly accepted meaning as set forth in the book "Asphalts and Allied Substances" by Herbert Abraham, D. Van Nostrand Co., Inc., New York, 5th edition, vol. 1, 1945 especially pages 56–69.

While tars are useful in the practice of this invention, asphalt is the preferred bitumen and petroleum refined asphaltic bitumens, straight or air blown, having a softening point range between about 100° F. and 250° F. and preferably between about 160° F. and 220° F., either 100% solid or containing solvents are especially suitable in the preparation of liquid elastomer-bitumen coating compositions suitable for use in accordance with the present invention.

Liquid elastomeric coating compositions prepared with polyurethane elastomeric polymers derived from polydiene polymers having terminal allylic hydroxy groups may be one or two-component systems wherein the polyurethane component may be prepared using the one-step urethane, one-step urea-urethane or prepolymer techniques.

Coating compositions may be applied in accordance with the practice of the present invention using any of the numerous known commercial techniques as, for instance, brushing, spraying, casting, and the like, although spray coating has been found to be most advantageous. Whereas the coating compositions are preferably liquid at ambient temperatures, adjusting viscosity to adapt to the application techniques employed may be accomplished by heating or use of compatible solvent systems. Coatings of at least about .03" and preferably between about .05" and .07" are employed to inhibit seepage of water into the soil substrate.

If desired, polyhydroxy resins that are reactive with isocyanate groups may be admixed with the polydiene polymers containing terminal allylic hydroxy groups to prepare polyurethane-bitumen elastomer coating compositions having properties suitable for particular applications. In addition, other additives and pigments may be added to the coating compositions or to either of the compounds used. Examples of such materials are $SiO_2$ containing materials such as silica, calcium silicate and the aerosils, wood flour, metal flakes, organic and inorganic natural or synthetic fibers (wool, cellulose, nylon, polyester, glass, asbestos, etc.), antioxidants, antiozonants, deodorants, fungicides, plasticizers, and so forth.

This invention is further indicated by the following examples which are illustrative and in no way limitative of its scope. All percentages are reported by weight.

EXAMPLE 1

A two-component elastomeric coating composition was prepared having the following composition:

| Component A: | Percent |
|---|---|
| Asphalt composition: | |
| Asphalt | 21 |
| Toluene | 9 |
| Hydroxy terminated polybutadiene | 58 |
| Tertiary amine catalyst | 2.4 |
| Toluene | 9.6 |
| **Component B:** | |
| Asphalt composition: | |
| Asphalt | 50 |
| Toluene | 21.4 |
| Polymethylene polyphenylisocyanate | 28.6 |

The asphalt composition used in preparing the composition of this example was a mid-continent oxidized asphalt having a 180° F. ASTM Ball and Ring softening point dissolved in toluene.

The hydroxy terminated polybutadiene polymer used in this example was a polydiene polymer containing terminal allylic hydroxy groups purchased under the tradename Poly B-D R–45M. The tertiary amine catalyst was purchased under the tradename DAB CO LV–33.

Components A and B were prepared separately by mixing the materials until a homogeneous mixture was obtained.

A water catch basin about 25' x 10' and 3 feet deep at its deepest point was dug in an area of predominately clay soil and sufficient quantities of Components A and B were prepared to coat the surfaces of the basin. Equal quantities of Components A and B were mixed and then sprayed over the dirt surfaces of the basin using standard commercial spraying equipment. The coating composition was readily sprayed over the interior surfaces of the basin and about 2" of the surrounding edges. After about 24 hours the coating was tack free and a small strip of coating removed from the edge was observed to be elastic and tough. The coating thickness ranged from about 0.050" to 0.065".

The basin was filled with water and a plastic cover was placed over the entire surface to prevent loss by evaporation. After 3 and 6 months the water level in the basin had not perceptibly changed.

EXAMPLE 2

A two-component elastomeric coating composition was prepared having the following composition:

| Component A: | Percent |
|---|---|
| Hydroxy terminated polybutadiene polymer | 32.4 |
| Propoxylated sorbitol polyether resin | 13.8 |
| Asphalt composition | |
| Asphalt | 20.0 |
| Mineral spirits | 10.7 |
| Toluene | 21.3 |
| Tertiary amine catalyst | 1.8 |
| **Component B:** | |
| Asphalt composition | |
| Asphalt | 37.6 |
| Mineral spirits | 20.2 |
| Toluene diisocyanate | 15.1 |
| Toluene | 27.1 |

The asphalt composition used in this example was a midcontinent oxidized asphalt having a ASTM Ball and Ring softening point of 180° F. dissolved in mineral spirits. The hydroxy terminated polybutadiene polymer of Example 1 was used in preparing the composition of this example. The tertiary amine catalyst of Example 1 was used in this example. The propoxylated sorbitol polyether resin used in this example was purchased under the tradename FOMREZ PO 807.

Components A and B were prepared separately by mixing the ingredients until a homogeneous mixture was obtained. Sufficient quantities of Components A and B were prepared to coat the surface of a small basin having dimensions similar to the basin used in Example 1. Equal quantities of Components A and B were thoroughly mixed and then sprayed over the dirt surfaces of the basin using standard commercial spraying equipment. The coating composition was readily sprayed over the interior surfaces of the basin and about 2" of the surrounding edges. After 24 hours the coating was tack free and was found to be tough and elastic. The coating thickness ranged from about 0.05" to 0.07".

The basin was filled with water and completely covered with a plastic sheet to prevent evaporation losses. After 3 months and 6 months the water level was not perceptibly lower.

What is claimed is:

1. The method for inhibiting water loss due to seepage into soil substrata surfaces of water catchment reservoirs and channels which comprises applying a liquid elastomeric polymer coating composition over the soil substrate surface of said reservoirs and channels, and curing the coating composition to form a conforming, continuous, thin, cohesive water-impermeable membrane which inhibits water loss from the body of water due to seepage into the soil substrate surfaces.

2. The method of claim 1 wherein said cohesive membrane is a polyurethane elastomer.

3. The method of claim 1 wherein said cohesive membrane is a polyurethane-bitumen elastomer.

4. The method of claim 3 wherein said polyurethane component is derived from the reaction of a polyisocyanate and a polydiene polymer and/or copolymer containing terminal allylic hydroxy groups, and said bitumen component is asphalt.

5. The method of claim 1 wherein said cohesive membrane is about 0.03" to about 0.07" thick.

6. The method of claim 5 wherein said liquid elastomeric coating is spray applied.

7. The method of claim 4 wherein said cohesive membrane comprises between about 20% and 90% by weight of said polyurethane component and between about 80% and 10% by weight of asphalt.

8. A body of water contained in water catchment reservoir and/or channel comprising a reservoir and/or channel soil substrate, a continuous, thin, cohesive, water-impermeable membrane coating conforming to the soil substrate surfaces, said cohesive membrane having been formed by curing in situ a liquid elastomeric polymer coating composition.

9. The body of water of claim 8 wherein said cohesive membrane coating is a polyurethane-bitumen elastomer.

10. The body of water of claim 9 wherein said cohesive membrane coating comprises between about 20% and 90% by weight of polyurethane component derived from the reaction of a polyisocyanate and a polydiene polymer and/or copolymer containing terminal allylic hydroxy groups, and between about 80% and 10% by weight of asphalt.

11. The body of water of claim 8 wherein said cohesive membrane coating is about 0.03" to about 0.07" thick.

References Cited

UNITED STATES PATENTS

| | | | |
|---|---|---|---|
| 2,801,984 | 8/1957 | Morgan | 166—295X |
| 2,981,070 | 4/1961 | Seely, Jr. | 61—.5 |
| 3,077,054 | 2/1963 | Niemeijer | 117—6 |
| 3,312,069 | 4/1967 | Jorda | 166—295X |
| 3,312,296 | 4/1967 | Paramore et al. | 166—294X |
| 3,344,608 | 10/1967 | McEachran | 61—7 |
| 3,383,863 | 5/1968 | Berry | 61—1 |
| 3,418,813 | 12/1968 | Dillon | 61—1 |
| 3,421,584 | 1/1969 | Eilers et al. | 166—295 |
| 3,423,225 | 1/1969 | Coney et al. | 117—6 |

PETER M. CAUN, Primary Examiner

U.S. Cl. X.R.

61—7